United States Patent
McGrew

(10) Patent No.: US 6,717,940 B1
(45) Date of Patent: Apr. 6, 2004

(54) MESSAGE TRANSFER PART LEVEL THREE ALIAS POINT CODES

(75) Inventor: Michael Arthur McGrew, Columbus, OH (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/458,528

(22) Filed: Dec. 22, 1999

(51) Int. Cl.[7] .............................................. H04J 12/56
(52) U.S. Cl. .................... 370/354; 370/357; 370/389; 370/390
(58) Field of Search ................ 320/352, 353, 320/354, 355, 356, 357, 386, 389, 390, 392, 395.2, 395.5, 395.52, 400, 401, 395.6

(56) References Cited

U.S. PATENT DOCUMENTS

| | | | |
|---|---|---|---|
| 5,475,732 A | * 12/1995 | Pester, III | ............ 379/32.01 |
| 5,708,702 A | 1/1998 | DePaul et al. | |
| 5,812,639 A | * 9/1998 | Bartholomew et al. | ..... 370/352 |
| 6,333,931 B1 | * 12/2001 | LaPier et al. | ............ 370/385 |

FOREIGN PATENT DOCUMENTS

| | | |
|---|---|---|
| EP | 0912068 A2 | 4/1998 |
| WO | WO97/11563 | 3/1997 |

* cited by examiner

*Primary Examiner*—Wellington Chin
*Assistant Examiner*—William Schultz

(57) ABSTRACT

An apparatus having an identification code in a communication network comprising a transceiver coupled to the communication network receiving a message having an alias identification code assigned to a switch call controller and a separate independent switch fabric controller portion. The apparatus also having a processor coupled to the transceiver, an input/output port for communicating with the independent switch fabric controller device, for sending a resource allocation message to the input/output port for transmission to the switch fabric device in response to receiving the message having the switch fabric data portion.

20 Claims, 5 Drawing Sheets

MESSAGE TRANSFER PART LEVEL THREE ALIAS POINT CODES

BACKGROUND OF THE INVENTION

This invention relates to Common Channel Signaling System 7 and, in particular, to Message Transfer Part level 3 signaling to an independent signaling controller device.

The Signaling System No. 7 (SS7) protocol has been mandated for out-of-band signaling communication involving telecommunication network elements and has become a defacto worldwide standard which has been adopted by the International Telecommunication Union (ITU), American National Standards Institute (ANSI), Telcordia Technologies and European Telecommunications Standards Institute (ETSI). SS7 networks and protocols are used for efficient and secure worldwide telecommunications by standardizing data and telephone call setup, management, and tear down. SS7 messages are exchanged between network entities in dedicated bi-directional channels called signaling links. Signaling occurs out-of-band on the signaling links rather than in-band on voice channels or circuits. Furthermore, the out-of-band signaling provides for faster call setup times and more efficient use of voice circuits than in-band signaling.

There are three general types of network entities that are commonly found in SS7 networks. FIG. 1 is an illustration of a conventional SS7 communication network. A Service Switching Point (SSP) network entity 102, FIG. 1, is a class five telephonic type switch that originates, terminates, or passes telephone/data calls from a telephonic device 104. The SSP 102 sends signaling messages to other SSPs 106 to setup, manage, and release voice circuits 110 located at the other SSPs 106 as required to complete telephone/data calls.

A Service Control Point (SCP) network entity 114 is a centralized database used to determine how calls are routed (e.g. 1-800 and 1-888 numbers in North America). The SCP 114 sends a response to the originating SSP 102 containing the routing numbers associated with a dialed number. A call routing feature may allow an alternate routing number to be used by the SSP 102 if the primary dialed number is busy or the call is unanswered within a specified time. Actual call features implemented on the SCP 114 do vary from network to network and from feature to feature.

A Signal Transfer Point (STP) network entity 116 is a signaling switch for routing incoming messages on a signaling link 118 to an outgoing signaling link 118 based on the routing information contained in the SS7 message. The STP 116 acts as a hub in the SS7 signaling network improving utilization of the network by eliminating the need for direct signaling links between SSPs. Additionally, the STP 116 may perform global title translation, a procedure by which the destination network entity is determined from digits present in the signaling message.

SS7 signaling protocol is composed of layered protocols and may be mapped to the Open System Interconnection (OSI) seven layer reference model. A SS7 protocol stack is shown in FIG. 2. The first SS7 layer is the Message Transfer Part (MTP) level 1 202, FIG. 2, and is equivalent to OSI Physical Layer. The MTP level 1 202 defines the physical, electrical, and functional characteristics of a signaling link. Examples of the physical interfaces defined by MTP level 1 202 include E-1 (2048 kb/s; 32 64 kb/s channels), DS-1 (1544 kb/s; 24 64 kb/s channels), V.35 (56 kb/s), DS-0 (64 kb/s), and DS-0A (56 kb/s).

MTP Level 2 protocol 204 is the messaging that ensures transmission of a message between two network elements. MTP level 2 protocol 204 implements flow control, message sequence validation, error checking, and is equivalent to the OSI Data Link Layer. When an error occurs on a signaling link, a message is retransmitted. MTP level 2 protocol 204 defines three kinds of messages or signaling units.

The first message is the Fill-In Signal Units (FISUs) which are transmitted continuously on a signaling link in both directions unless other signal units are present. The FISUs carry basic level 2 protocol information only, such as an acknowledgment of signal unit receipt by a remote signaling point. The second message is the Link Status Signal Units (LSSUs) which carries one or two octets of link status information between signaling points at either end of a link. the signaling link status is used to control signaling link alignment and indicates the status of a network entity to another network entity. The third message is the Message Signal Units (MSUs) carrying all call control, database query and response, network management, and network maintenance data. MSUs have a routing label which allows an originating signaling point to send information to a destination signaling point across the network.

MTP level 3 protocol 206 ensures accurate end-to-end transmission of a message across a network and provides message routing between network elements in the SS7 network and is equivalent in function to the OSI Network Layer. MTP level 3 protocol 206 routes messages based on the routing label in the signaling information field (SIF) of the message signal units. The routing label is comprised of the destination point code (DPC), originating point code (OPC), and signaling link selection (SLS) field. Point codes are numeric addresses which normally uniquely identify each network entity in the SS7 network and may be used as the address which identifies the user parts at that entity.

The DPC identifies a SSP 102, FIG. 1, with the switching fabric controller integrated together with the signaling controller having the same destination point code. All messages for trunk management must be routed to the integrated signaling controller of the SSP 102. Once the messages are received at the signaling controller, the data contained in the messages is processed and the required actions are given to the integrated switch fabric controller (the switch fabric being the collection of voice or data links between SSPs).

The MTP level 3 protocol 206, FIG. 2, contains the MTP level 3 message routing label which identifies the originating and destination SS7 devices. Network devices, such as STP 116, FIG. 1, have message transfer capabilities that enables call and/or data traffic to be re-routed away from failed links and signaling points in addition to controlling traffic when congestion occurs.

Level 4 protocol 208 and higher in the SS7 signaling protocol are for control of the voice channels and considered application level protocols. Some examples of application level protocols are the Telephone User Part (TUP) and Integrated Service User Part (ISUP). The SCCP protocol 210 is a MTP User Part that provides connection-less and connection-oriented network services to protocols above MTP level 3 protocol 206 that are not related to the voice channels. While the MTP level 3 protocol 206 provides routing labels that enable messages to be addressed to specific network entities, the SCCP protocol provides subsystem numbers that allow messages to be addressed to specific applications running on an individual network entity. The SCCP protocol 210 is used as the transport layer for services such as 1-800/888 service, calling card, wireless roaming, and personal communication services (PCS).

The SCCP protocol 210 provides the means by which a STP 116, FIG. 1, can perform global title translation (GTT), a procedure by which the destination network entity and subsystem number (SSN) is determined from digits present in the signaling message. The global title digits, for example, may be the dialed 800/888 number, calling card number, or mobile subscriber identification number depending on the service requested. Because a STP 116 provides global title translation, originating network entities do not need to maintain a database of destination point codes and subsystem numbers associated with specific services and possible destinations. Therefore, SCCP GTT can be used to identify routes to specific network elements.

The redirecting of the messages at the SCCP protocol level 210, FIG. 2, to another network entity results in the message being sent to a network device such as SCP 114 which contains the database for processing the routing digits. Information is processed from the SCCP 210 messages, such as the dialed digits, and used as an index into a database. The index into the database results in a MTP level 3 206 destination point code being identified for the SCCP message.

In turn, SCCP 114 used the SCCP 210 to send a reply back to the originating element which has an integrated switch fabric, such as a SSP (PSTN telephonic switch). A disadvantage of GTT is the functionality resides at the MTP user level and requires additional processing of messages resulting in increased message processing at transfer points. In a network, redundant STP 116 elements that have the GTT functionality may be paired and both assigned an additional common signaling point code to be used only so that MTP level 3 206 can address their common point code and have redundant access to the function. The SCCP aliasing is limited by the SCCP protocol messages being directed to the GTT processing elements. Accordingly there is along felt need in the art to permit general aliasing of point codes at MTP level 3, especially to extend the concept to the ISDN User Part, resulting in more reliable processing of messages in the SS7 network.

SUMMARY OF THE INVENTION

The problems noted above are solved in accordance with the invention and a technical advance is achieved in the art, by using a Service Switching Point that has the SS7 signal controller independent from the switching fabric network element. The MTP level 3 messages containing alias destination point codes results in messages being routed to network devices with minimal processing and increased reliability of the Service Switching Points. Additionally, by allowing the separation of the switching fabric from the MTP level 3 messaging interface the aliasing at the MTP level 3 protocol solves the problem of only being able to send to integrated switch fabrics and signaling controllers by extending the aliasing capability to multiple Call Controllers.

BRIEF DESCRIPTION OF THE DRAWINGS

The advantageous features of the invention will be explained in greater detail and others will be made apparent from the detailed description of the present invention which is given with reference to the several figures, in which.

DETAILED DESCRIPTION

Figure 1:
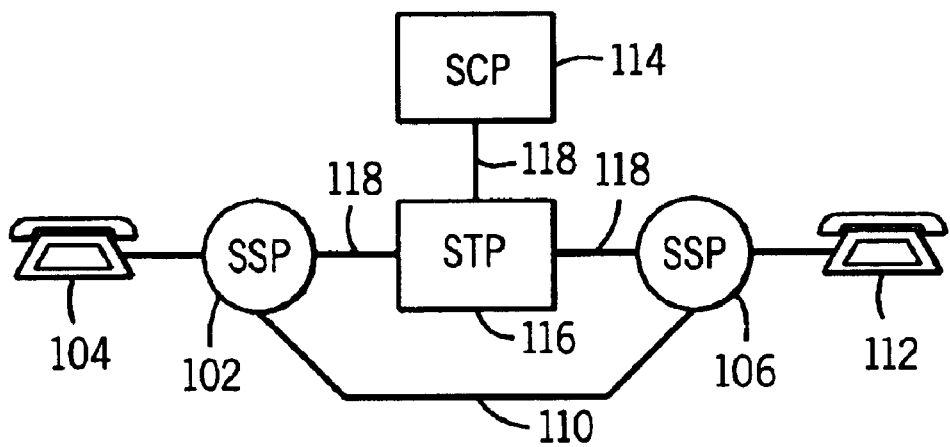
FIG. 1 is a block diagram of a conventional communication network.
Figure 2:
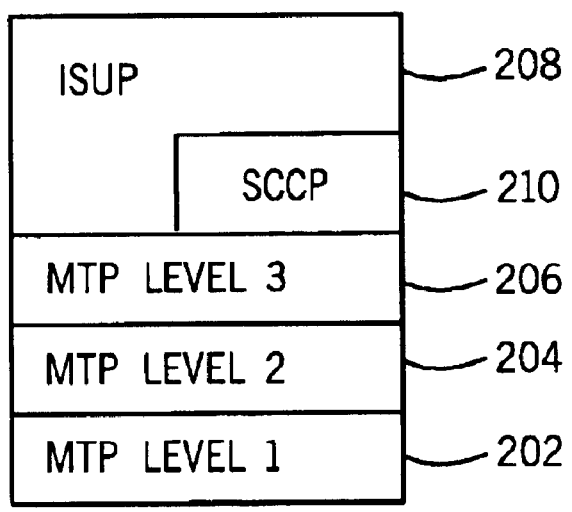
FIG. 2 is a diagram of a conventional Signaling System 7 protocol stack.
Figure 3:
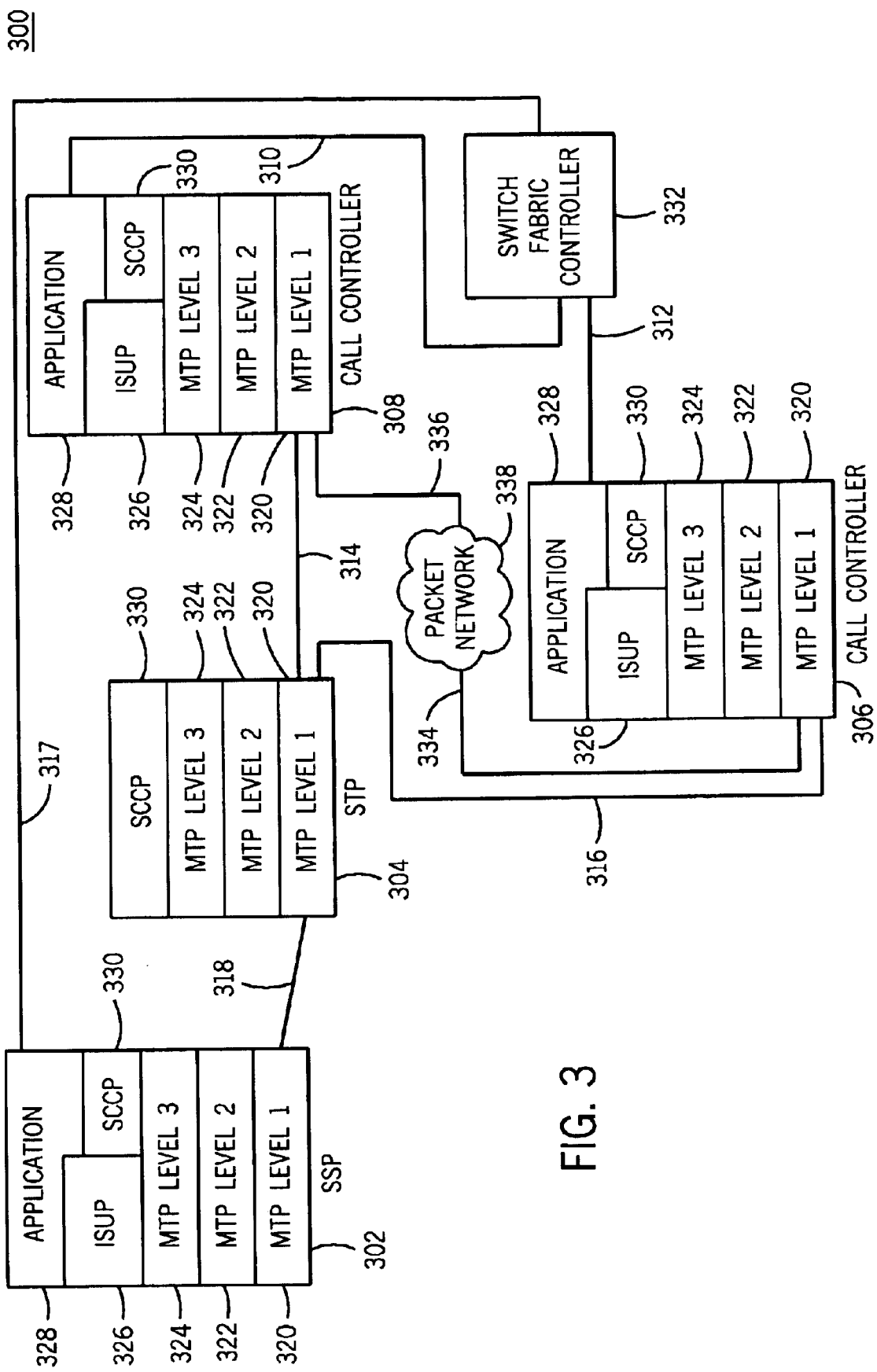
FIG. 3 is a diagram of a communication network illustrating network devices and protocol stacks in accordance the present invention.

In FIG. 3, a diagram of a communication network 300 illustrating network devices and protocol stacks is shown. A SSP 302 assigns a voice circuit 317 that connects with a switch fabric controller 332. The SSP 302 is a network device such as a PBX or a class five type telephonic switch and is shown with an integrated signal controller and switch fabric controller. The SSP 302 uses Signaling System 7 (SS7) out-of-band signaling to assign voice or traffic circuits. An application 328 running on the SSP 302 determines that a voice circuit 317 is required for a telephone/data call and formats a signaling message for transmission across the network. The message is encapsulated by the MTP level 3 protocol 324 routing label that contains an identification code (e.g. a SS7 destination point code of call controller 306). The message is then inserted into the MTP level 2 protocol 322 and sent over the MTP level 1 physical interface 320 to the network entity connected to the signaling link 318.

The STP 304 receives the message via the signaling link 318 and the MTP level 1 physical interface 320. The received message is then removed from the MTP level 2 protocol 322 and the MTP level 3 protocol 324 is examined. The MTP level 3 protocol 324 contains the destination identification. The STP 304 determines where to route the circuit request. In the present example, sending the circuit request to the call controller.

If the signaling communication path 314 between the STP 304 and call controller device 306 is unavailable and the communication path to the other call controller device 308 is available, then the SS7 encoded message is sent over the signaling link 314 from the STP 304 to the other call controller device 308. The message is received at MTP level 1 interface 320 encapsulated in the MTP level 2 protocol 322 at the other call controller device 308. At the MTP level 3 protocol 324, the destination identification code is identified as an alias point code belonging to the other call controller device 306. Then at the ISUP protocol level 326, the circuit request information from the SSP 302 is processed by an application running at the application level 328. The application then communicates over a communication link 310 with the switch fabric controller 332 resulting in the voice circuit 317 being controlled. Thereafter, the SSP 302 and switch fabric controller 332 acknowledge assigning the voice circuit 317 and a connection path is established.

If the STP 304 attempts to send the message to the other call controller device 308 and the signaling link 314 or the other call controller 308 is unavailable, then the message may selectively be routed to the call controller device 306, where the destination identification code of the other call controller device 308 is supported as an alias identification code. The STP 304 then transmits the messages via signaling link 316 to the signal controller 306.

The message is received at the call controller device 306 at the MTP level 1 physical interface 320. The MTP level 2 message protocol 322 overhead is removed and the resulting MTP Level 3 message is then further processed at the call controller device 306. The MTP level 3 determines the destination identification code from the routing label. The identification code from the routing label is determined to be associated with the other call controller device 308 and is an alias identification code at the call controller device 306.

The call controller device 306 processes the ISUP protocol portion of the received SS7 message after the MTP levels are processed. The ISUP message carries the request for circuit assignment. The circuit request is processed at the application level 328 and a message is sent over a communication link 312, separate from the SS7 communication network 300, to the switch fabric controller 332.

In an alternate embodiment, an additional communication-path may exist between call controller device 306 and the other call controller device 308. An additional communication path 334 from the call controller device 306 is coupled to a packet network 338. The other call controller device 308 is also coupled to the packet network 338 by another additional communication path 336. If the signaling link 314 is unavailable, then the signaling message may selectively be routed via the signaling link 316 to the call controller device 306. The call controller device 306 has another path to the other call controller device 308 via the packet network 338. The signaling message is routed back to the other call controller device 308 via the packet network, provided the other call controller device 308 is functioning. If the other call controller device 308 is not functioning, then the signaling message is processed by the call controller device 306.

Figure 4:
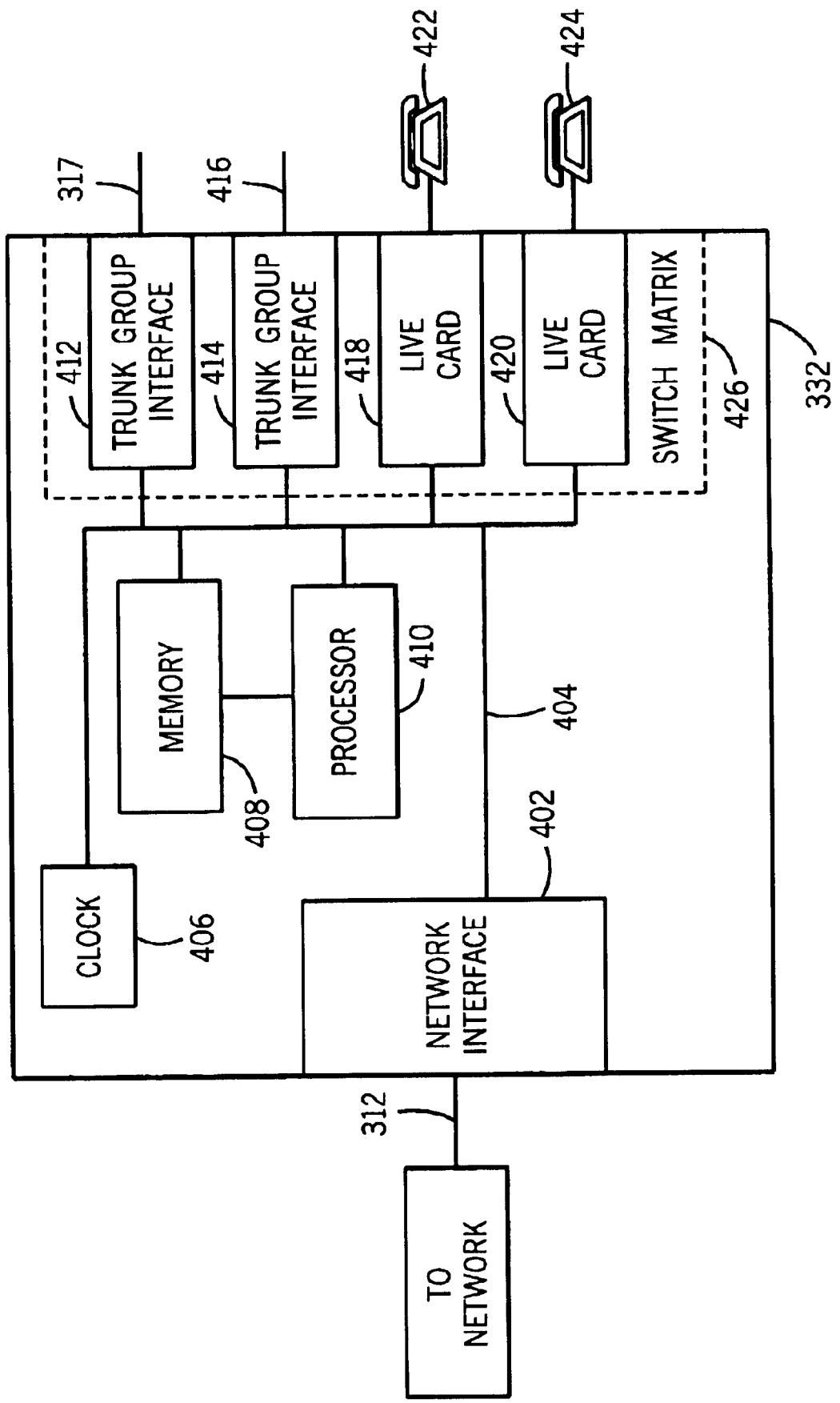
FIG. 4 is a block diagram of a switch fabric controller having connections to two signaling controllers in accordance with the present invention.

Turning to FIG. 4, a block diagram of an independent switch fabric controller 332 is shown. The switch fabric controller 332 has a network interface 402 coupled to a network 403 by a communication link 312. A data bus 404 is coupled to the network interface 402, a processor 410, a memory 408, a clock 406, line cards 418, 420, and trunk group interfaces 412, 414. The processor 410 is also coupled directly to the memory 408. Additionally, each of the trunk group interfaces is coupled to a trunk group containing voice circuits 317, 416 respectively, and each of the line cards 418, 420 is connected to a telephonic device 422, 424. The voice circuits 317, 416 terminating at the trunk group interfaces 412, 414 and the line cards 418, 420 may selectively be coupled together within the switch fabric controller by a switch matrix 426 allowing any voice circuit to be connected to any line card.

The independent switch fabric controller 332 receives a circuit allocation message at the network interface 402 from the call controller device 306, FIG. 3, over a communication link 312, FIG. 4. The processor 410 then accesses and processes the data contained in the message received via the data bus 404. The typical messages received by the switch fabric controller 332 require a voice circuit in a trunk group to be assigned or released.

If the message received requires a circuit to be assigned, the processor 410 identifies an available circuit by checking the states of the trunk circuits and marking the circuit to be assigned as busy in a data structure stored in the memory 408. The processor 410 then instructs the switch matrix 426 to make a connection between the selected voice circuit 317 and the appropriate line card 418 with the associated telephonic device 422.

The clock 406 provides a synchronization signal for the processor 410, network interface 402, trunk group interfaces 412, 414, and line cards 418, 420. The synchronization signal allows digital messages to be properly received by and transmitted from the switch fabric controller 332. The synchronization signal also allows the data bus to be utilized efficiently by different components. The synchronization signal is preferably supplied from the clock 406, but may be derived from a time signal present on the signaling link 316 or communication link 312.

Figure 5:
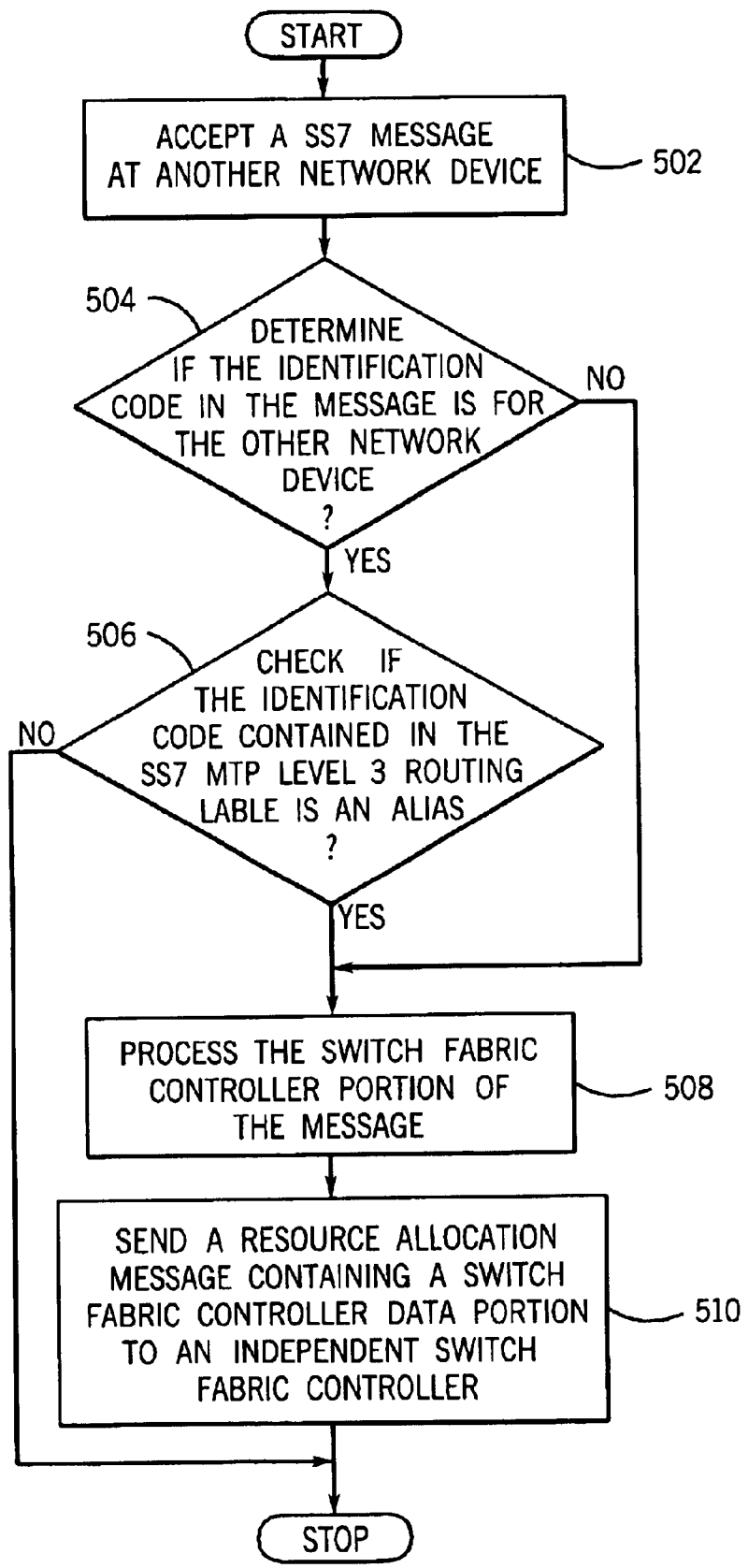
FIG. 5 is a flow chart diagram illustrating the steps performed at a network entity in order to send a SS7 message containing an alias identification code.

In FIG. 5, a flow chart diagram illustrating the steps of an embodiment of the invention performed at a network entity, such as the switch fabric controller 332, FIG. 3, and using an alias identification code in a communication network 300 is shown. In step 502, a SS7 message is accepted by the other call controller device 308, FIG. 3. The processor 410, FIG. 4, determines if the identification code in the MTP level 3 routing label of the received SS7 message is for another network device, such as call controller 306, FIG. 3, step 502. If the identification code in the routing label is for the receiving network device, then the data contained in the message is processed and acted on in step 508.

If the identification code is for another network device, e.g. call control device 306, FIG. 3, then the identification code is checked to verify that it is not an alias point code, step 506, FIG. 5. If the identification code is either for the other call controller device 308, FIG. 3, or an alias network device (the call controller device 306), then in step 508, FIG. 5, the switch fabric portion of the message is processed. If the identification code is not for the other call controller device 308, FIG. 3, or an alias identification code in step 506, FIG. 5, then the received message is not a valid message for the other call controller device 308, FIG. 3. When the processing of the switch fabric portion of the message is complete 508, FIG. 5, the other call controller device 308, FIG. 3, sends a resource allocation message containing a switch fabric controller data portion to the independent switch fabric controller 332, FIG. 3, step 510.

Figure 6:
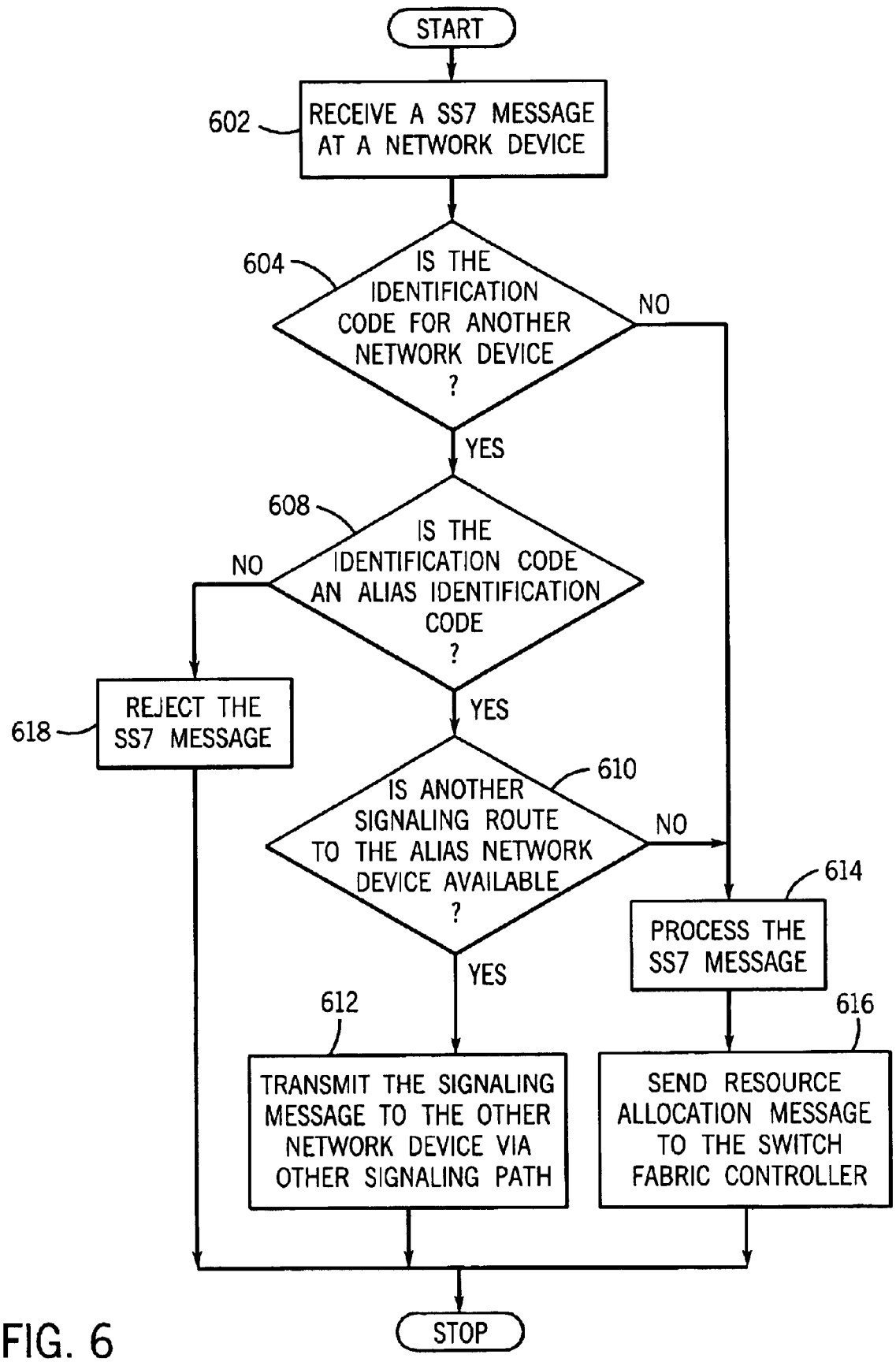
FIG. 6 is a flow chart diagram illustrating the steps performed at a network entity in order to process a SS7 message received using an alias identification code.

FIG. 6 shows a flow chart diagram illustrating the steps performed at a network entity in order to process a SS7 message received using an alias identification code where the SS7 message is forwarded to and eventually processed at the original addressed network entity. In step 602 a network device (call controller device 306, FIG. 3) in a communication network receives a SS7 message from a sending SS7 device (STP 304). The SS7 message is checked to determine if the message contains an alias identification code of another call controller device 308 (alias network device) in step 604, FIG. 6. In step 608, if the SS7 is associated with an alias identification code in step 608, then the call controller device 306, FIG. 3, checks if an alternate signaling route to the other call controller device 308 is available in step 610. If the alternate signaling route is available the call controller device 306 transmits the SS7 message to the other call controller device 308 in step 612, FIG. 6, an processing is complete.

The alternate signaling route may be over the SS7 network or another network (packet network 338). In the present embodiment, the alternate route is over the communication paths 334 and 336 that connect the SS7 network with the packet network 338. In other embodiments, other types of networks such as satellite, wireless, microwave, supporting Internet Protocol, X.25, or any other type of network capable of carrying SS7 messages.

If the identification code is for another network device in step 604, FIG. 6, and the identification code is not and alias identification code in step 608, then the SS7 is rejected by the call controller device 306, FIG. 3. If the identification code is identified as belonging to the receiving network device (call controller device 306 in step 604, FIG. 6, then the SS7 message is processed in step 614 and a resource allocation message is sent to the switch fabric controller in step 616.

In step 610, if an alternate path to the other call controller device 308, FIG. 3 is unavailable, then in step 614, FIG. 6, the SS7 message is processed by the call controller device 306, FIG. 3. If the alternate path to the other call controller device 308 is available in step 610, FIG. 6, then the SS7 message is routed by the call controller device 306, FIG. 3, to the other call controller device 308 (other network device) in step 612, FIG. 6.

While the specification in this invention is described in relation to certain implementations or embodiments, many details are set forth for the purpose of illustration. Thus, the foregoing merely illustrates the principles of the invention. For example this invention may have other specific forms without departing from its spirit or essential characteristics. The described arrangements are illustrative and not restrictive. To those skilled in the art, the invention is susceptible to additional implementations or embodiments and certain of the details described in this application can be varied considerably without departing from the basic principles of the invention. It will thus be appreciated that those skilled in the art will be able to devise various arrangements which, although not explicitly described or shown herein, embody the principles of the invention are thus within its spirit and scope.

Although an explanation of embodiments of the present invention have been made above with reference to the specification and drawings, the scope of the invention is defined by the claims which follow.

What is claimed is:

1. A method of aliasing a first network device in a communication network, the method comprising the steps of:
    transmitting over a first communication path to a second network device a message containing an alias identification code that serves to identify the first network device, wherein the second network device is identifiable by an identification code different from the alias identification code; and
    sending from the second network device a resource allocation message containing a switch fabric controller data portion over a second communication path.

2. The method of claim 1 in which the step of transmitting further comprises the steps of receiving the message at the second network device, and
    determining that the alias identification code contained in the message serves to identify the first network device.

3. The method of claim 2 in which the step of determining further comprises the step of processing a Message Transfer Part level 3 protocol portion of the message.

4. The method of claim 1 in which the step of sending further comprises the steps of identifying the switch fabric controller data portion of the message, and
    transmitting the switch fabric controller data portion over the second communication path.

5. The method of claim 4 in which the step of transmitting further comprises the step of formatting the resource allocation message containing the switch fabric controller data portion for transmission over the second communication path.

6. The method of claim 5 in which the second communication path is a packet network.

7. A method of aliasing a first network device in a communication network, the method comprising the steps of:
    accepting at second network device identified by an identification code different from an alias identification code that identifies the first network device, a message containing the alias identification code received over a first signaling route, and
    sending the message from the second network device to the first network device associated with the alias identification code over a second signaling route.

8. The method of claim 7 in which the step of sending further comprises determining if the second signaling route is available.

9. The method of claim 8 in which the step of determining further comprises the steps of formatting the message for transmission over the second signaling route, and
    transmitting the message over the second signaling route.

10. The method of claim 9 in which the step of formatting includes the step of encoding the message as a signaling system 7 (SS7) message.

11. The method of claim 9 in which the step of formatting includes the step of encoding the message for transmission over a packet network.

12. An apparatus identified by a first identification code in a communication network, the apparatus comprising:
    a transceiver coupled to the communication network which receives a message that comprises a second identification code that identifies a network device and a switch fabric data portion having instructions for management of a traffic circuit, wherein the alias identification code is different from the first identification code;
    an input/output port for communicating with an independent switch fabric controller device; and
    a processor coupled to the transceiver and the input/output port which sends a resource allocation message to the input/output port for transmission to the independent switch fabric controller device in response to receiving the message having the switch fabric data portion.

13. The apparatus of claim 12 in which the communication network is a Signaling System 7 (SS7) networks.

14. The apparatus of claim 13 in which the second identification code is an alias Message Transfer Part (MTP) level 3 destination point code.

15. A system comprising:
    a first network element coupled to a network in which the network element is identified by an alias identification code; and
    a second network element identified by an identification code that is different from the alias identification code in which the second network element is also coupled to the network and receives a message with the alias identification code of the first network element.

16. The system of claim 15 further comprising a switch fabric controller having at traffic circuit coupled by a communication path to the first network element and the second network element.

17. The system of claim 16 in which the second network element sends a resource allocation message via the communication path to the switch fabric controller in response to receiving the message with the alias identification code of the first network element.

18. The system of claim 17, in which the resource allocation message has instructions for the switch fabric controller to manage the at least one traffic circuits.

19. The system of claim 15 in which the network is a signaling system 7 network.

20. The system of claim 19 in which the alias identification code is a Message Transfer Point (MTP) level 3 destination point code.

* * * * *